United States Patent
Uemura et al.

(10) Patent No.: US 7,126,969 B1
(45) Date of Patent: Oct. 24, 2006

(54) SCALABLE SYSTEM AND METHOD FOR RELIABLY SEQUENCING CHANGES IN SIGNALING BITS IN MULTICHANNEL TELECOMMUNICATION LINES TRANSMITTED OVER A NETWORK

(75) Inventors: Jose Uemura, Cupertino, CA (US); Rafael Gomez, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 964 days.

(21) Appl. No.: 09/611,108

(22) Filed: Jul. 6, 2000

(51) Int. Cl.
*H04J 3/12* (2006.01)
(52) U.S. Cl. .................................................. 370/522
(58) Field of Classification Search .............. 370/235, 370/230, 412, 229, 232, 233, 234, 253, 389, 370/392, 396, 395.3, 395.31, 395.4, 395.41, 370/400, 409, 419, 465, 468, 522, 523, 509
See application file for complete search history.

(56) References Cited

U.S. PATENT DOCUMENTS

| | | | |
|---|---|---|---|
| 5,359,592 A | | 10/1994 | Corbalis et al. |
| 5,430,715 A | * | 7/1995 | Corbalis et al. ............ 370/392 |
| 5,519,701 A | * | 5/1996 | Colmant et al. ............ 370/412 |
| 5,533,020 A | * | 7/1996 | Byrn et al. .............. 370/395.4 |
| 5,570,360 A | * | 10/1996 | Klausmeier et al. ........ 370/232 |
| 5,835,494 A | * | 11/1998 | Hughes et al. .............. 370/397 |
| 5,838,915 A | * | 11/1998 | Klausmeier et al. ........ 709/215 |
| 5,873,089 A | * | 2/1999 | Regache ..................... 707/100 |
| 5,917,815 A | * | 6/1999 | Byers et al. ................ 370/352 |
| 5,938,749 A | * | 8/1999 | Rusu et al. ................... 710/54 |
| 6,034,945 A | * | 3/2000 | Hughes et al. ............. 370/230 |
| 6,072,794 A | * | 6/2000 | Kang ......................... 370/352 |
| 6,108,307 A | * | 8/2000 | McConnell et al. ........ 370/235 |

(Continued)

OTHER PUBLICATIONS

"What Is . . . CAS (column address strobe or channel associated signaling) (a definition)"; www.whatis.com (1 page).

(Continued)

*Primary Examiner*—Hassan Kizou
*Assistant Examiner*—Ricardo Pizarro
(74) *Attorney, Agent, or Firm*—Marger Johnson & McCollom, P.C.

(57) ABSTRACT

Provided is a system and method for reliably processing changes in signaling bits for telecommunication transmitted over a network. The system includes a plurality of framer farms adapted to generate a corresponding plurality of event signals responsive to a corresponding plurality of signaling events. An event manager is adapted to sequence the plurality of event signals. The plurality of framers is adapted to receive a corresponding plurality of digital signals, extract therefrom corresponding signaling data, and generate a corresponding event signal responsive to the signaling data. A signaling queue is adapted to queue the signaling data and a signal register is adapted to read the signaling queue. The event manager includes an event queue adapted to queue the plurality of event signals, a status register adapted to maintain a status of the event queue, and an event register adapted to read the event queue. The event manager further includes a queue depth register adapted to indicate a number of event signals received at the event queue and a maximum queue depth register adapted to indicate a maximum number of event signals capable of being received at the event queue. A partially full register is adapted to indicate a fraction of the maximum number of event signals capable of being received at the event queue. The status register includes a queue full field, an almost full field, an overrun field, and a queue empty field adapted to maintain a status of the event queue.

41 Claims, 11 Drawing Sheets

U.S. PATENT DOCUMENTS

| | | | | |
|---|---|---|---|---|
| 6,226,262 | B1 * | 5/2001 | Sterne et al. | 370/231 |
| 6,315,452 | B1 * | 11/2001 | Titcomb | 384/114 |
| 6,337,851 | B1 * | 1/2002 | Charny et al. | 370/232 |
| 6,389,019 | B1 * | 5/2002 | Fan et al. | 370/395.42 |
| 6,396,843 | B1 * | 5/2002 | Chiussi et al. | 370/418 |
| 6,404,752 | B1 * | 6/2002 | Allen et al. | 370/335 |
| 6,430,191 | B1 * | 8/2002 | Klausmeier et al. | 370/412 |
| 6,434,161 | B1 * | 8/2002 | Higbee et al. | 370/413 |
| 6,487,202 | B1 * | 11/2002 | Klausmeier et al. | 370/395.1 |
| 6,560,196 | B1 * | 5/2003 | Wei | 370/230.1 |
| 6,657,970 | B1 * | 12/2003 | Buckingham et al. | 370/249 |
| 6,674,718 | B1 * | 1/2004 | Heddes et al. | 370/230 |
| 6,810,043 | B1 * | 10/2004 | Naven et al. | 370/412 |

OTHER PUBLICATIONS

Channel Associated Signaling Voice Switching; Cisco Documentation (7 pages) May 31, 2000.

"What Is . . . T-carrier system (a definition)"; www.whatis.com (1 page).

"What Is . . . a frame (a definition)"; www.whatis.com (1 page).

"What Is . . . a channel (a definition)"; www.whatis.com (1 page).

"What Is . . . data (a definition)"; www.whatis.com (1 page).

"What Is . . . digital signal X (DS0, DS1 . . . DS4) (a definition)"; www.whatis.com (2 pages).

DS0-DS3—Digital Signal Services Available over T1, T2, and T3 Signaling Systems (9 pages).

* cited by examiner

FRAMER FARM WITH N DS1/E1 FRAMER

FRAMER FARM 1
SIGNALING QUEUE

FRAMER FARM 2
SIGNALING QUEUE

1

| 1 | 2 | 6 |
|---|---|---|
| 0 | 2 | 4 |

2

| 1 | 2 | 6 |
|---|---|---|
| 0 | 2 | 4 |

| 1 | 3 | 11 |
|---|---|----|
| 0 | 3 | 10 |

3

| 1 | 1 | 22 |
|---|---|----|
| 0 | 1 | 20 |
| 0 | 2 | 6  |
| 0 | 2 | 4  |

| 1 | 3 | 11 |
|---|---|----|
| 0 | 3 | 10 |

FIG. 8

PROCESSOR

SCALABLE SYSTEM AND METHOD FOR RELIABLY SEQUENCING CHANGES IN SIGNALING BITS IN MULTICHANNEL TELECOMMUNICATION LINES TRANSMITTED OVER A NETWORK

BACKGROUND OF THE INVENTION

1. Field of the Invention

The invention relates generally to a system and method for improving telecommunications and, more particularly, to a system and method for reliably processing changes in signaling bits in multichannel telecommunication lines sent over a global network.

2. Description of the Prior Art

Digital carrier technology is the predominant means of transmitting voice communication over global computer networks in use today. The North American T-carrier system of voice transmission, introduced in the 1960s by Bell System, operates using the Digital Signal (DS) series as a base multiple. DS is a term used for the series of standard digital transmission rates or levels based on DS0, a transmission rate of 64 Kbps. 64 Kbps is the standardized bandwidth typically associated with a single telephone voice channel. DS1, used as the signal in the T1 carrier, comprises 24 DS0 (64 Kbps) signals, channels, or timeslots transmitted using pulse-code modulation (PCM) and time-division multiplexing (TDM). The DS1 frame has a duration of 125 μsec.

In the T1 system, voice signals are sampled 8,000 times a second and each sample is digitized into an 8-bit word. With 24 timeslots being digitized at the same time, a 192-bit frame (24 timeslots each with an 8-bit word) is thus being transmitted 8,000 times a second. Each frame is separated from the next by a single framing bit, resulting in a 193-bit block. The 192-bit frame multiplied by 8,000 and the additional 8,000 framing bits make up the T-1's 1.544 Mbps data rate. The signaling bits are the least significant bits per frame.

The E1 system is the European format for digital transmission. In the E1 system, signals are carried at 2.048 Mbps (32 timeslots at 64 Kbps). E1 and T1 lines are often interconnected for international use.

Channel Associated Signaling (CAS) refers to signaling in which control signals, such as those for synchronizing and bounding frames, are carried in the same channel or timeslot along with the voice and data signals. In DS1 CAS, control information is embedded in signaling frames where the least significant bit of each DS0 within the frame is robbed for signaling. Signaling frames are found every $6^{th}$ frame. For AB signaling, frame 6 carries the A bit and frame 12 carries the B bit. For ABCD signaling, frames 6, 12, 18, and 24 carry the corresponding ABCD bits. The 24 frames form what is known as Extended Super Frame or ESF. CAS signaling is used for call set up and termination. Signaling is accomplished by detecting changes in the ABCD bits.

In E1, the signaling bits are presented in timeslot 16 of frames within a E1 multiframe.

FIG. 1 is a block diagram of a conventional signaling system 10 for processing changes in signaling bits for telecommunication transmitted over a global network. The signaling system includes framers 1, 2, . . . , N for receiving corresponding DS1/E1 signals.

The framers 1, 2, . . . , N extract the signaling bits from the DS1/E1 signals, store them in corresponding buffers 14A, 14B, . . . , 14N, and present them to processor 12 for further processing. Buffers 14A, 14B, . . . , 14N are often sized to allow one entry for each channel, timeslot, or DS0. Thus, buffers 14A, 14B, . . . , 14N shown in FIG. 1 have, e.g., 24 registers, one for each of the 24 timeslots making up a single DS1 signal. As new events arrive with signaling bit changes for a particular timeslot on a corresponding DS1/E1 signal, the framers 1, 2, . . . , N overwrite the pre-existing entry. Alternatively, the framers 1, 2, . . . , N each include a fixed buffer (not shown in FIG. 1) that is overwritten every time a new bit changes in an ESF.

In both cases, signaling bits can be lost before being processed by the processor 12. In the first case, if a new event arrives for a timeslot before the microprocessor 12 services the preexisting event, the preexisting event is lost. In the second case, the microprocessor 12 must process all events before a new DS1/E1 signal arrives with its consequent bit changes, e.g., within 3 ms.

Lost signaling bits result in unsuccessful call set up and termination. Lost signaling bits increase the incidence of dropped calls. Lost signaling bits also cause problems to higher layers of the signaling stack as changes are simply overwritten without notification. Finally, lost signaling bits increase call retries adversely affecting the operating speed.

Accordingly, a need remains for a scalable system and method for reliably sequencing signaling bit changes in telecommunications transmitted over a global network.

BRIEF DESCRIPTION OF THE DRAWINGS

The foregoing and other objects, features, and advantages of the invention will become more readily apparent from the following detailed description of a preferred embodiment that proceeds with reference to the following drawings.

FIG. 7 illustrates the order of events processed in the signaling system shown in FIG. 4.

FIG. 8 is a flow diagram of the operation of the signaling system without the event manager 42 shown in FIG. 4.

FIG. 9 illustrates the order of events processed in the signaling system without the event manager 42 shown in FIG. 4.

DETAILED DESCRIPTION OF THE PREFERRED EMBODIMENT

Figure 1:
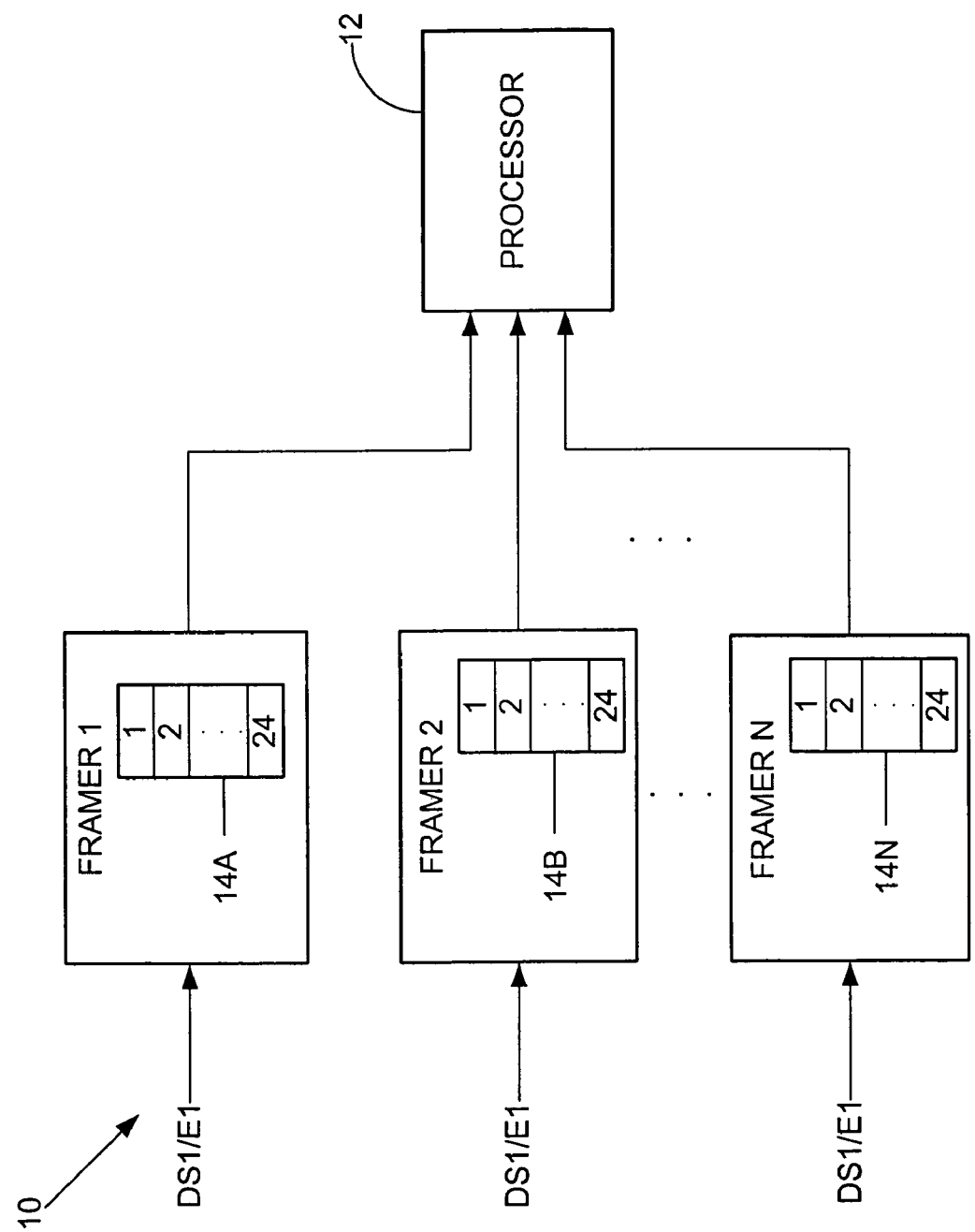
FIG. 1 is a block diagram of a conventional signaling system 10 for processing changes in signaling bits.
Figure 2:
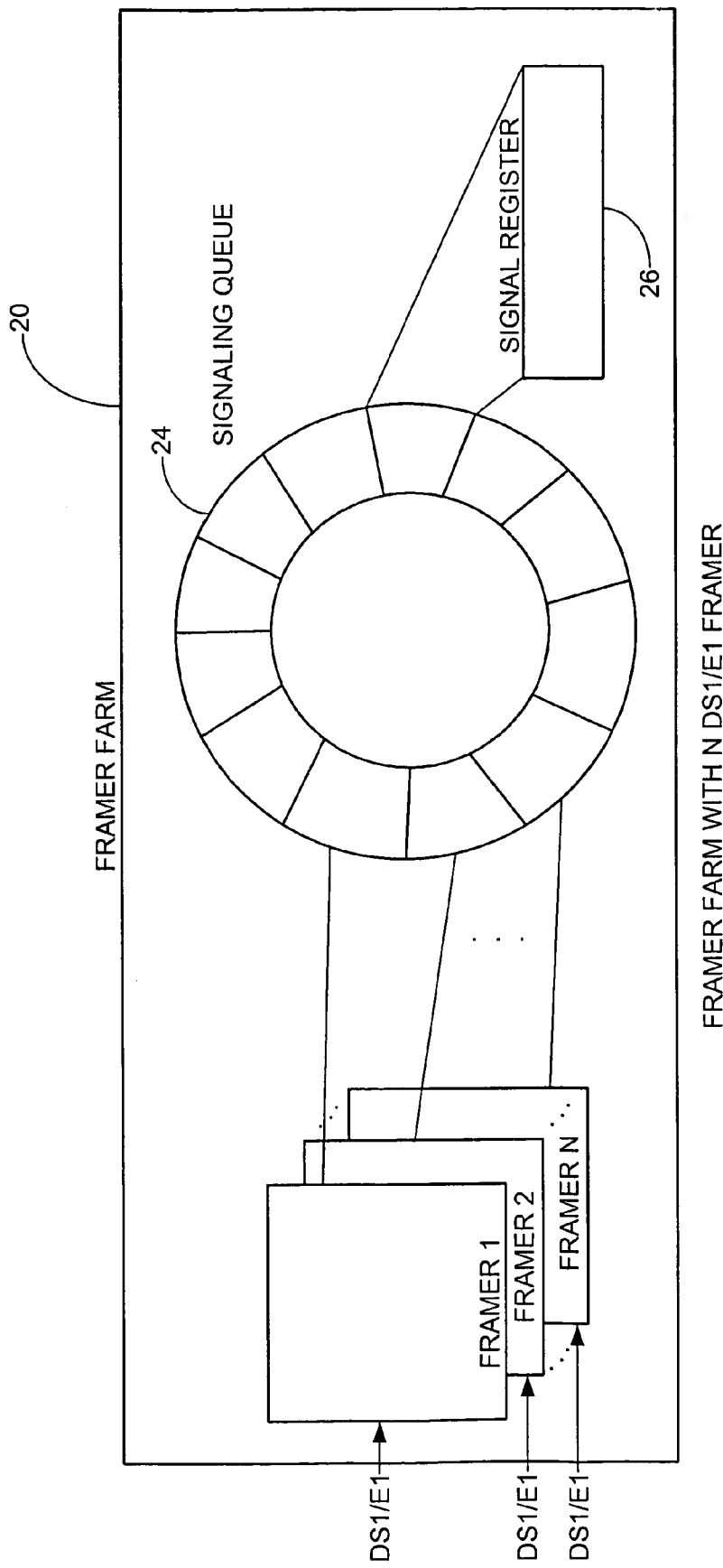
FIG. 2 is a block diagram of a framer farm according to the present invention.

Referring to FIG. 2, a framer farm 20 includes a plurality of framers 1, 2, . . . , N that receive a corresponding plurality of DS1/E1 signals. The framers 1, 2, . . . , N extract signaling events from the DS1/E1 signals. That is, for DS1, the framers 1, 2, . . . , N extract the ABCD signaling bits from the appropriately numbered frames—frames 6, 12, 18, and 24—of the DS1 signals received. For E1, ABCD signaling bits are extracted from timeslot 16. Framers, like framers 1, 2, . . . , N, are well known in the art and will not be described in further detail.

The signaling data or events (ABCD change bits) are stored in a signaling queue 24 as they are received by the framers 1, 2, . . . , N. The signaling queue 24 is preferably internal to the framer farm 20. The signaling queue 24 can alternatively be implemented external to the framer farm 20. The signaling queue 24 is read using the signaling register 26.

Figure 3:
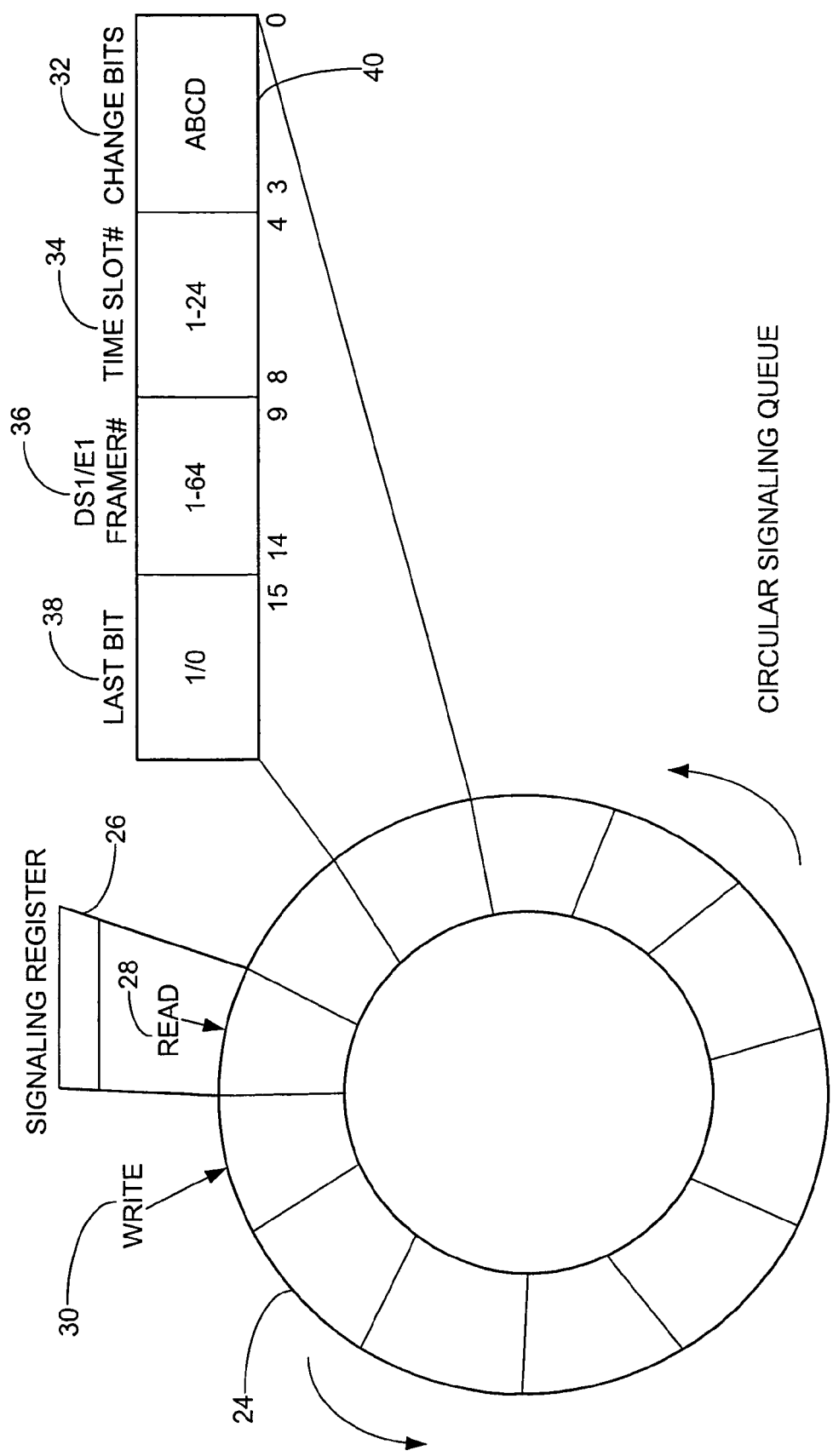
FIG. 3 is a diagram of the signaling queue shown in FIG. 2.

FIG. 3 is a block diagram of the signaling queue 24. Referring to FIG. 3, the signaling queue 24 is preferably a circular queue meaning that entries are read and stored in a circular or round-robin fashion with read and write pointers 28 and 30, respectively. Reading the signaling register 26 cause the entry pointed by the read pointer 28 to appear in the signaling register 26 and increments the read pointer 28 to the next element in the signaling queue 24.

An exemplary signaling queue entry 40 is shown in FIG. 3. The queue entry 40 includes a signaling data field 32 adapted to store the signaling data for a predetermined framer. The signaling data field 32 is, for example, 4 bits in length to identify the A, B, C, and D bits. A timeslot identification field 34 is adapted to identify a channel or timeslot related to the signaling data for the predetermined framer. The timeslot identification field 34 is, for example, 5 bits in length to identify any of the 24 (or 30 for E1) DS0 channels or timeslots. A framer identification field 36 is adapted to identify the predetermined framer generating the signaling data. The framer identification field 36 is, for example, 6 bits in length to identify up to 64 framers. A last entry field 38 is adapted to identify a last entry for a predetermined framer. The last entry field is, for example, a single bit in length.

The framer farm 20 is preferably a monolithic semiconductor integrated circuit. A person skilled in the art, however, should realize that the framer farm 20 can be implemented in a variety of ways including software, firmware, hardware, or a combination thereof.

Figure 4:
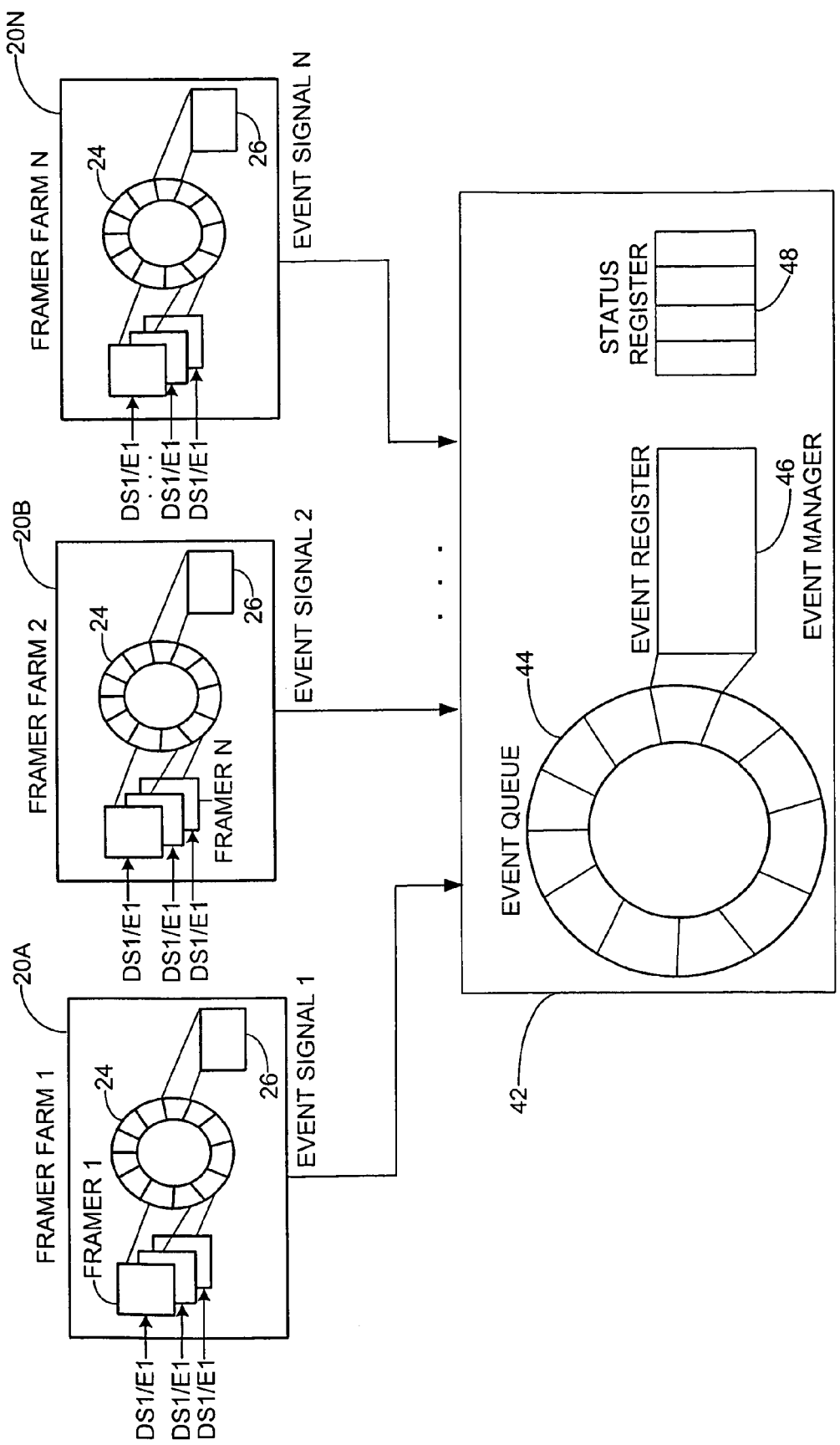
FIG. 4 is a block diagram of a system incorporating multiple framer farms shown in FIG. 2 for reliably sequencing changes in signaling bits for telecommunication transmitted over a network according to the present invention.

Referring to FIG. 4, a telecommunication system includes an event manager 42 that interfaces a plurality of framer farms 20A, 20B, . . . , 20N and processes their request for service. The event manager 42 operates in conjunction with the signaling registers 26 of the framer farms 20A, 20B, . . . , 20N. Each framer farm 20A, 20B, . . . , 20N includes corresponding signaling queues 24, signaling registers 26, and pluralities of framers 1, 2, . . . , N adapted to receive a corresponding plurality of DS1/E1 signals as shown in FIGS. 2 and 3.

Each framer farm 20A, 20B, . . . , 20N generates a corresponding event signal responsive to a signaling event occurring at one of the framers included therein. For example, framer farm 20A generates an event signal 1 responsive to framer 1 receiving signaling data on its DS1/E1 signal. Framer farm 20B generates an event signal 2 responsive to framer N receiving signaling data on its DS1/E1 signal. The framer farms 20A, 20B, . . . , 20N can use a variety of criteria for generating the event signals, e.g., every time signaling data is received at a corresponding framer, after a predetermined number of signaling data are received, after a predetermined amount of time has occurred, variable depending on empirical optimization of system loading, or by merely programming the desired criteria. A person skilled in the art should realize the criteria listed for generating event signals are only exemplary and that many more variations are possible.

The primary function of the event manager 42 is to properly sequence the plurality of signaling data in order of their arrival to thereby minimize the chance of losing signaling data. The event manager 42 manages the event queue 44 using an event register 46 and a status register 48.

Figure 5A:
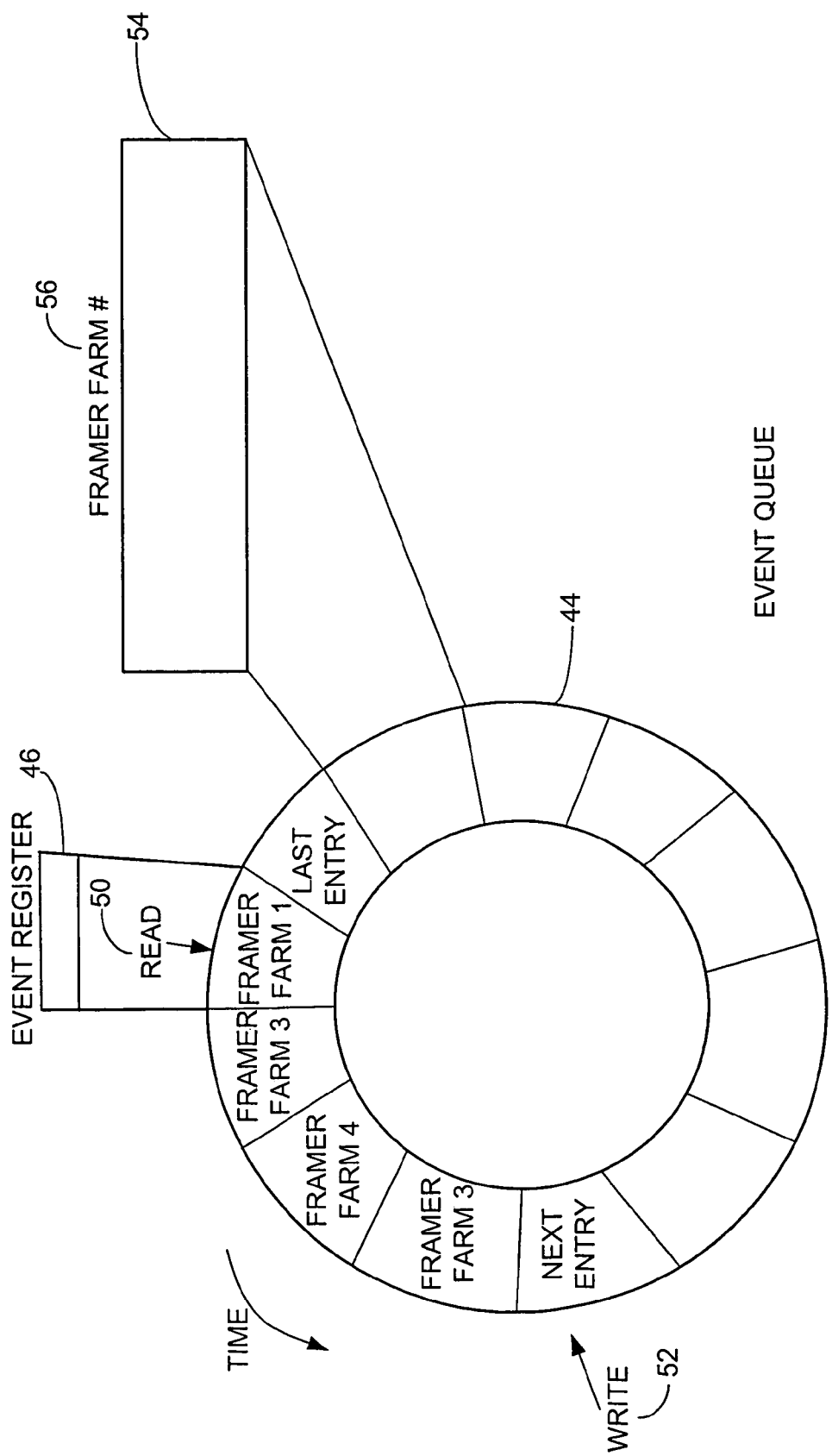
FIG. 5A is a block diagram of the event queue shown in FIG. 4.

FIG. 5A is a block diagram of the event queue 44 shown in FIG. 4. Referring to FIG. 5A, the event queue 44 is adapted to receive and queue the plurality of event signals 1, 2, . . . , N. The event queue 44 is a circular queue meaning that entries are read and stored in a circular or round-robin fashion with read and write pointers 50, respectively. Reading the event register 46 causes the entry pointed to by the read pointer 50 to appear in the event register 46 and increments the read pointer 50 to the next element in the event queue 44.

An exemplary event queue entry 54 is shown in FIG. 5A. The event queue entry 54 includes a framer farm identification field 56 that, as the name suggests, identifies the framer farm generating the event signal.

The circular event queue 44 prevents multiple services to the same framer farm when other framer farms have active event signals. For example, if framer farm 1 and 3 generate concurrent event signals 1 and 3 at a time t0 and framer farms 3 and 4 generate concurrent event signals 1 and 2 at a time t1, the event manager 42 will store the event signals in the event queue 44 as shown in FIG. 5A. That is, the event manager 42 will store the event signals from farmer farms 1 and 3 first followed by the event signals generated by framer farms 4 and 3. The only information stored in the event queue 44 is the framer farm number as mentioned above.

Figure 5B:
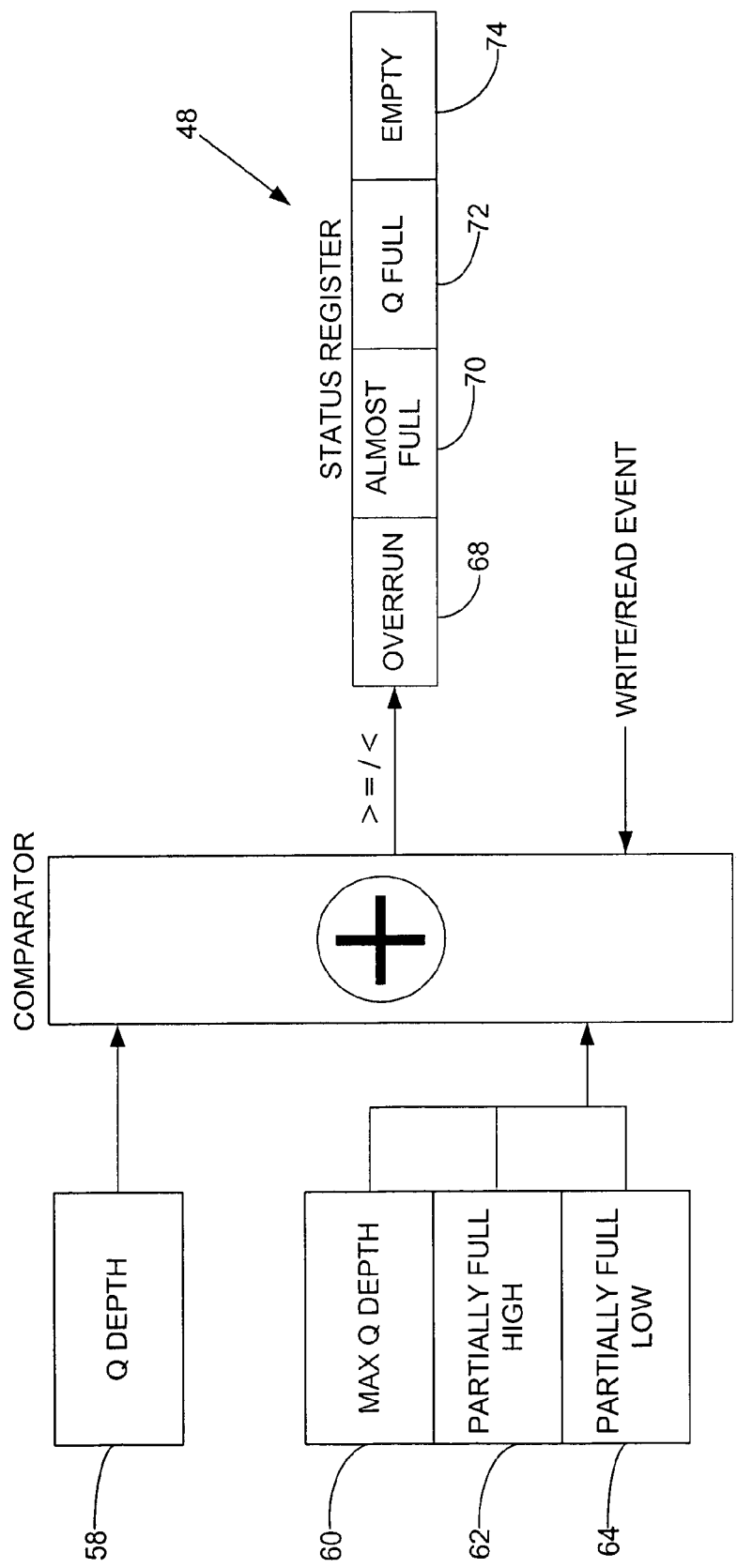
FIG. 5B is a block diagram of the registers associated with the event queue shown in FIG. 4.

Referring to FIG. 5B, the event manager 42 comprises a queue depth register 58, maximum queue depth register 60, partially full high register 62, and partially full low register 64 that work together with the status register 48 to maintain the status of the event queue 44 and manage service to the framer farms 20A, 20B, . . . , 20N. The event manager 42 increments the queue depth register 58 every time a new event signal is queued in the event queue 44 and decrements the queue depth register 58 every time an event signal is removed from the queue 44. The event manager 42 sets the queue full bit 72 in the status register 48 when the queue depth register 58 is greater than or equal to the maximum queue depth register 60. By doing so, the event manager 42 prevents data over runs in the event queue 44. That is, the event manager 42 prevents event signals from being overwritten in the event queue 44. One embodiment of the queue depth register 58 is the absolute difference between the read and write pointers 50 and 52, respectively. A person skilled in the art should appreciate that the queue depth register 58 can be implemented in a variety of ways.

The event manager 42 sets the overrun bit 68 when a single or multiple event signals are missed because the event queue 44 is full as indicated by the queue full bit 72. In other words, the event manager 42 sets the overrun bit 68 when an event signal arrives (a write event) at the event queue 44 and the queue full bit 72 is set.

The partially full register high and low registers 62 and 64, respectively, are fully programmable to a fraction of the queue depth register, e.g., ½, ¼, or ¾. The event manager 42 sets the almost full bit 70 in the status register 48 when the queue depth register 58 is greater than or equal to the partially full high register 62. Optionally, an interrupt line to a processor (not shown) might be made available to help expedite the removal of events from the event queue 44 by the processor (not shown) thereby preventing the event queue 44 from becoming full, losing event signals and their consequent signaling data.

The partially full high and low register 62 and 64, respectively, provide hysteresis between writing and reading event signals from the event queue 44 by a processor (not shown). Once the event manager 42 sets the almost full bit 70, the event manager 42 resets the almost full bit 70 using the partially full low register 64 value that is at a lower depth. Doing so signals the processor (not shown) to quickly empty the event queue 44 (fast reads) until the partially full low register 64 threshold is reached allowing the processor to resume normal operation.

The event manager 42 operates as follows. After power on or reset, the event queue 44 is empty and the read and write pointers 50 and 52, respectively, are set to the same value, e.g., O. When one or more of the framer farms 20A, 20B, ..., 20N requests service of the processor (not shown) by issuing a corresponding event signal 1, 2, ..., N, the event manager 42 resolves, if needed, the service sequence. The event manager 42 indicates to the processor (not shown) the order in which the framer farms are to be serviced by writing the framer farm identification number in the framer farm identification field 56 in the event queue 44.

After receiving an event signal from a corresponding framer farm, the event manager 42 then checks the status register 48. In particular, the event manager 42 determines if the queue full bit 72 is set. If so, the event manager 42 sets the overrun bit 68, increments the write pointer 52 by 1, and increments the queue depth register 58 by 1. The event manager 42 then compares the queue depth register 58 with the partially full high register 62 and sets the almost full bit 70, if required. The event manager 42 then compares the queue depth register 58 with the maximum queue depth register 60 and sets the queue full bit 72, if required. The event manager 42 finally sets the interrupt line (not shown) to the processor (not shown), if enabled. The processor (not shown) then proceeds to service the framer farms 20A, 20B, ..., 20N in the sequence dictated by the event queue 44.

When the processor (not shown) removes an event signal from the event queue 44, the event manager 42 increments the read pointer 50 by 1 and decrements the queue depth register by 1. The event manager 42 compares the queue depth register 58 with the partially full low register 64 resetting the almost full bit 70, if necessary. The event manager 42 then compares the queue depth register 58 with the maximum queue depth register 60 and resets the queue full bit 72 and overrun bit 68, if required.

Figure 6A:
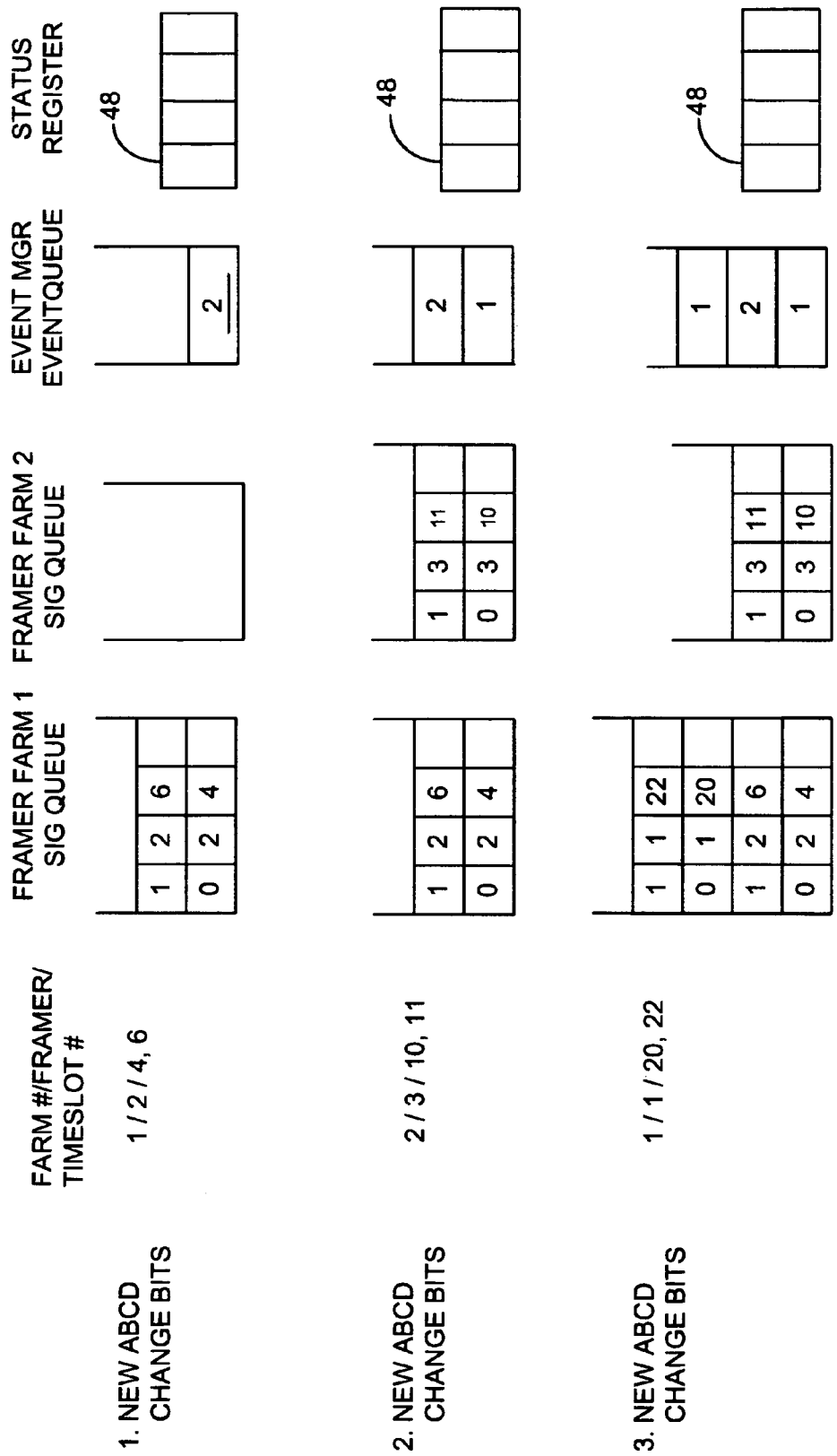
FIGS. 6A–C are exemplary diagrams of the operation of the signaling system shown in FIG. 4.
Figure 6B:
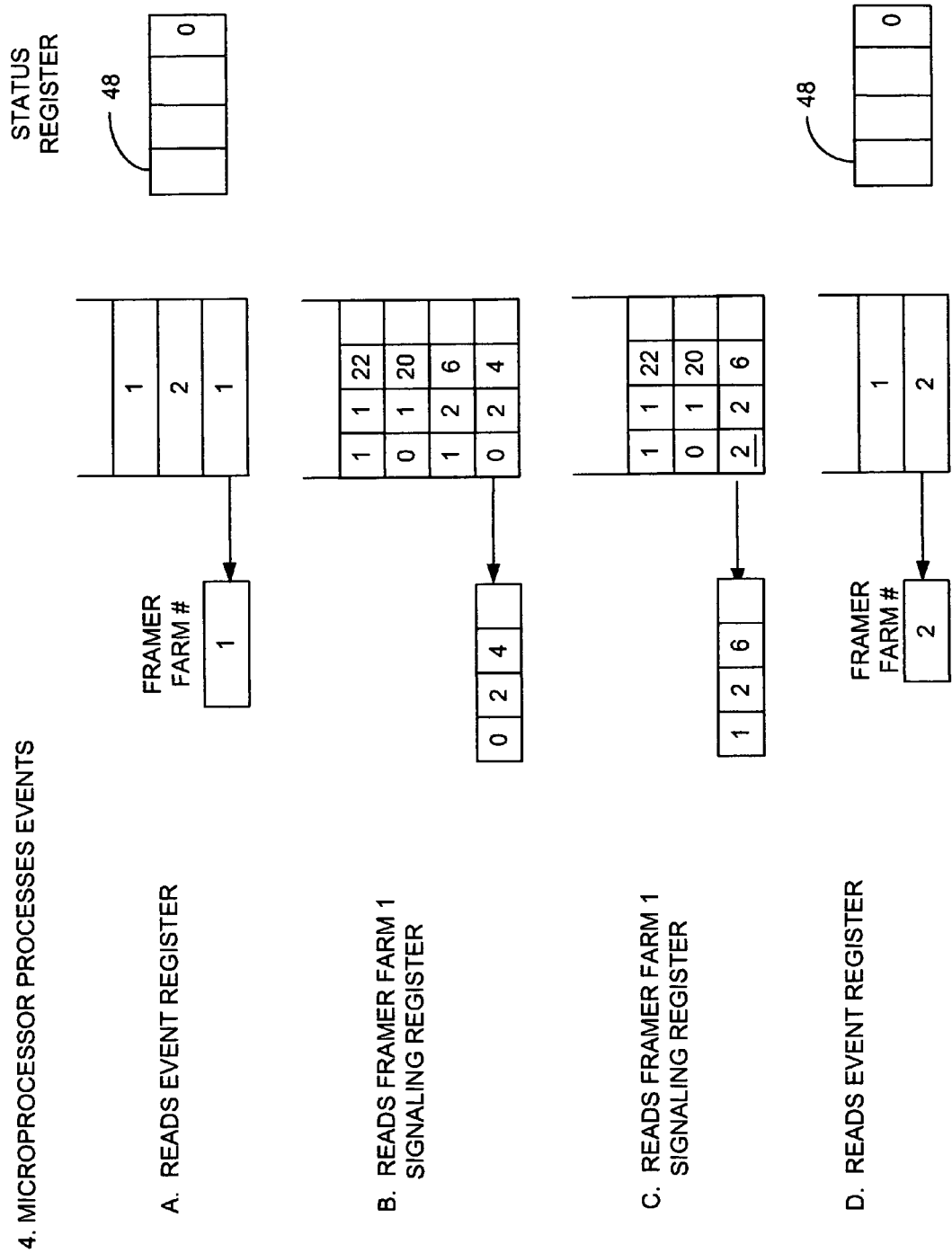
Figure 6C:
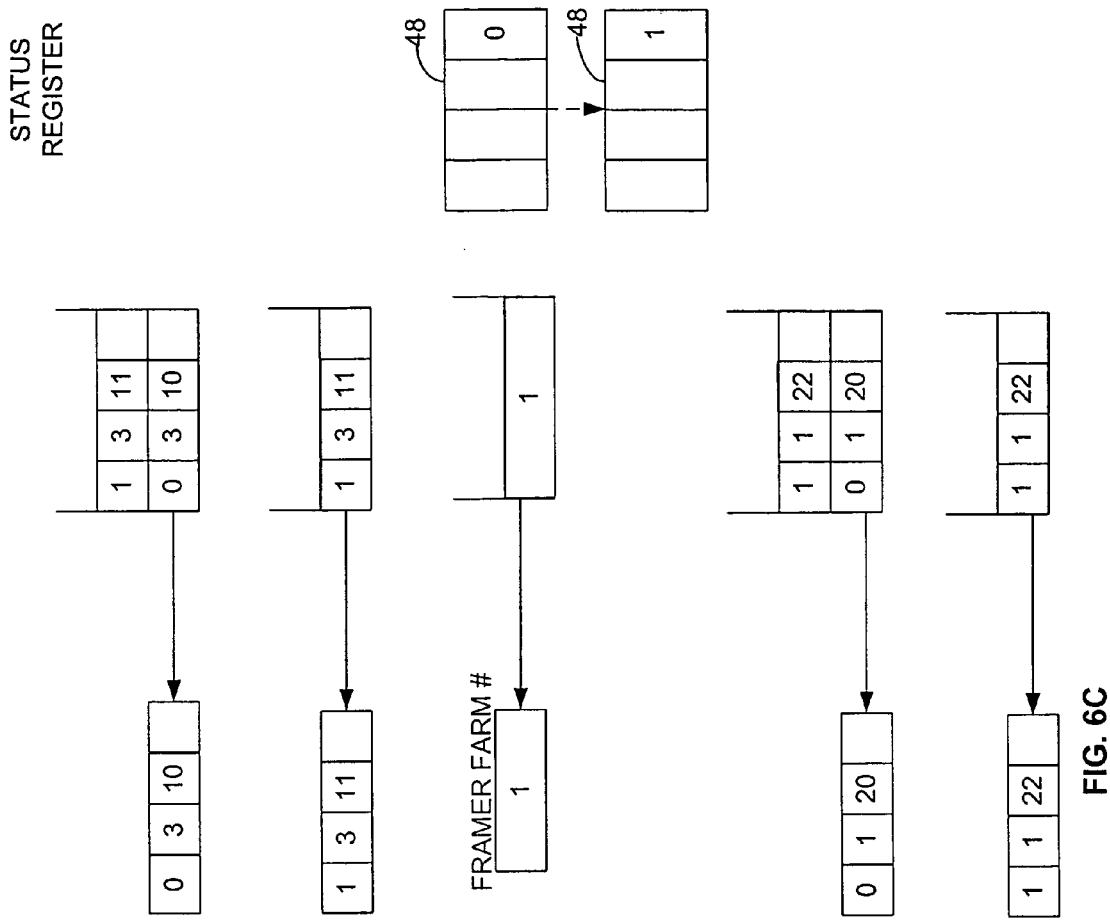

FIGS. 6A–C show an example of signaling data arriving at individual framers and how the telecommunication system shown in FIG. 4 processes the signaling data. In FIGS. 6A–C, the framer farms 20A, 20B, ..., 20N are designated as framer farms 1, 2, ..., N for simplicity. Referring to FIG. 6A, at (1), framer farm 1, framer 2, receives new ABCD signaling data from timeslots 4 and 6. The framer farm 1 queues the signaling data in the signaling queue 24 and generates an event signal that it sends to the event manager 42. The event manager 42 queues the framer farm identification number in the event queue 44.

At (2), framer farm 2, framer 3, receives new ABCD signaling data from timeslots 10 and 11. The framer farm 1 queues the signaling data in the corresponding signaling queue 24 and generates a corresponding event signal that it sends to the event manager 42. The event manager 42 queues the framer farm identification number in the event queue 44.

Similarly, at (3), the framer farm 1, framer 1, receives new ABCD signaling data for timeslots 20 and 22. Framer farm 2 queues the signaling data in the corresponding signaling queue 24 and generates a corresponding event signal that it sends to the event manager 42. The event manager 42 queues the framer farm identification number in the event queue 44.

Referring to FIG. 6B, the processor (not shown) services the signaling data. At (4)(A), the processor reads the event register 46 in the event manager 42. By doing so, the processor discovers that the framer farm 1 generated an event signal, that is, it received ABCD signaling data, and reads the framer farm 1 signaling register 26. The processor dequeues the first entry from the signaling queue 24 (at (4)(B)), processes it, dequeues the next entry, processes it, and decodes that it is the last entry (at (4)(C)) by reading the last bit field 38 of signaling register 26. At (4)(D), the processor reads the event register 46 and discovers that framer farm 2 generated an event signal.

Figure 7:
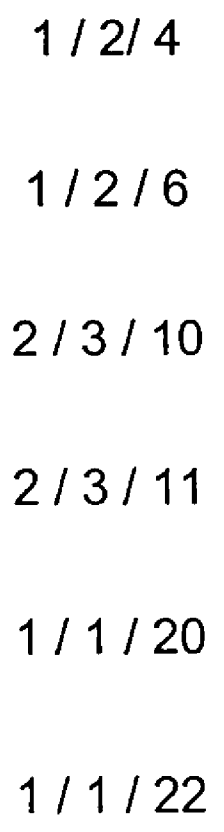

Referring to FIG. 6C, the processor reads the first event in the signaling register 26 of framer farm 2 (at (4)(E)). The processor then reads the second, and last event, in the signaling register 26 at (4)(F). At (4)(G), the processor goes back and reads the event register 46 and discovers that the framer farm 1 generated an event signal. The processor reads the first event in the framer farm 1 signaling register 26 (at (4)(H)). At (4)(I), the processor reads the second and last event in the framer farm 1 signaling register 26. FIG. 7 summarizes how the events were properly sequenced, that is, they were serviced by the processor in the exact order in which they arrived.

FIGS. 8–9 illustrate how the event signals are processed without the event manager 42. As is evident, the processor would service all four events (timeslots 4, 6, 20, and 22) in framer farm 1 before processing any event in framer farm 2 (timeslots 10 and 11) even though the events at framer farm 2 occurred in time before the last two events in framer farm 1. By doing so, signaling data can be lost, adversely affecting call set up and termination. The problem is compounded if the processor cannot process the signaling queues for long periods of time.

The invention can be implemented entirely within the framer farm in firmware (microcode), hardware, or a combination thereof. The invention can alternatively be implemented within the device with additional external components. Finally, the invention can be implemented entirely externally in software and/or firmware.

Those of skill in the art will appreciate that the invented system and method described and illustrated herein may be implemented in software, firmware or hardware, or any suitable combination thereof. Preferably, the system and method are implemented in a combination of hardware and software, for purposes of low cost and flexibility. Thus, those of skill in the art will appreciate that the system and method of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. A telecommunications system, comprising:
   a plurality of framer farms adapted to generate a corresponding plurality of event signals responsive to a corresponding plurality of signaling events, where the event signals are to request service for corresponding framer farms;
   an event manager adapted to sequence the plurality of event signals; and
   wherein each framer farm comprises
   a plurality of framers adapted to receive a corresponding plurality of digital signals, extract therefrom corresponding signaling data, and generate a corresponding event signal responsive to the corresponding signaling data;
   a signaling queue adapted to queue the corresponding signaling data; and
   a signal register adapted to read the corresponding signaling queue.

2. The system of claim 1 wherein the signaling queue is a circular queue.

3. The system of claim 2 wherein the signaling queue includes a signaling read and write pointer, wherein reading the signal register causes the corresponding signaling data pointed to by the read pointer to appear in the signal register and increments the signaling read pointer.

4. The system of claim 1 wherein the signal register comprises:
a signaling data field adapted to store signaling data for a predetermined framer;
a last entry field adapted to identify a last entry for the predetermined framer;
a framer identification field adapted to identify the predetermined framer; and
a timeslot identification field adapted to identify a timeslot related to the signaling data for the predetermined framer.

5. A telecommunications system, comprising:
a plurality of framer farms adapted to generate a corresponding plurality of event signals responsive to a corresponding plurality of signaling events, where the event signals are to request service for corresponding framer farms;
an event manager adapted to sequence the plurality of event signals;
wherein the event manager comprises:
an event queue adapted to queue the plurality of event signals,
a status register adapted to maintain a status of the event queue, and
an event register adapted to read the event queue; and
wherein the event queue includes an event read and write pointers, wherein reading the event register causes the event signal pointed to by the event read pointer to appear in the event register and increments the event read pointer.

6. A telecommunications system, comprising:
a plurality of framer farms adapted to generate a corresponding plurality of event signals responsive to a corresponding plurality of signaling events, where the event signals are to request service for corresponding framer farms;
an event manager adapted to sequence the plurality of event signals;
wherein the event manager comprises:
an event queue adapted to queue the plurality of event signals,
a status register adapted to maintain a status of the event queue, and
an event register adapted to read the event queue; and
wherein the event manager comprises:
a queue depth register adapted to indicate a number of event signals received at the event queue; and
a maximum queue depth register adapted to indicate a maximum number of event signals capable of being received at the event queue.

7. The system of claim 6 wherein the event manager comprises a partially full register adapted to indicate a fraction of the maximum number of event signals capable of being received at the event queue.

8. The system of claim 7 wherein the partially full register comprises:
a partially full high register adapted to indicate a high threshold of the maximum number of event signals capable of being received at the event queue; and
a partially full low register adapted to indicate a low threshold of the maximum number of event signals capable of being received at the event queue;
wherein the partially full high and low registers provide the event queue with hysteresis.

9. A telecommunications system, comprising:
a plurality of framer farms adapted to generate a corresponding plurality of event signals responsive to a corresponding plurality of signaling events, where the event signals are to request service for corresponding framer farms;
an event manager adapted to sequence the plurality of event signals;
wherein the event manager comprises:
an event queue adapted to queue the plurality of event signals,
a status register adapted to maintain a status of the event queue, and
an event register adapted to read the event queue; and
wherein the status register comprises:
a queue full field adapted to indicate when the event queue is full;
an almost full field adapted to indicate when the event queue is almost full;
an overrun field adapted to indicate when signaling events where missed due to the event queue being all; and
a queue empty field adapted to indicate when the signaling queue is empty.

10. An event manager, comprising:
an event queue adapted to queue a plurality of event signals;
a status register adapted to maintain a status of each of the plurality of event signals;
an event register adapted to read the event queue;
a queue depth register adapted to indicate a number of event signals received at the event queue;
a maximum queue depth register adapted to indicate a maximum number of event signals capable of being received at the event queue; and
a partially full register adapted to indicate a fraction of the maximum number of event signals capable of being received at the event queue.

11. The system of claim 10 wherein the partially full register comprises:
a partially full high register adapted to indicate a high threshold of the maximum number of event signals capable of being received at the event queue; and
a partially full low register adapted to indicate a low threshold of the maximum number of event signals capable of being received at the event queue;
wherein the partially full high and low registers provide the event queue with hysteresis.

12. The system of claim 11 wherein the status register comprises:
a queue full field adapted to indicate when the event queue is full;
an almost full field adapted to indicate when the event queue is almost full;
an overrun field adapted to indicate when signaling events where missed due to the event queue being full; and
a queue empty field adapted to indicate when the signaling queue is empty.

13. An event manager, comprising:
an event queuing means adapted to queue a plurality of event signals;
a status registering means adapted to maintain a status of each of the event signals; and
an event registering means adapted to read the event queue;

a queue depth registering means adapted to indicate a number of event signals received at the event queuing means;

a maximum queue depth registering means adapted to indicate a maximum number of event signals capable of being received at the event queuing means; and a partially full registering means adapted to indicate a fraction of the maximum number of event signals capable of being received at the event queuing means.

14. The system of claim 13 wherein the partially full registering means comprises:

a partially full high registering means adapted to indicate a high threshold of the maximum number of event signals capable of being received at the event queuing means; and a partially full low registering means adapted to indicate a low threshold of the maximum number of event signals capable of being received at the event queuing means;

wherein the partially full high and low registers provide the event queue with hysteresis.

15. The system of claim 14 wherein the status registering means comprises:

a queue full means adapted to indicate when the event queue is full;

an almost full means adapted to indicate when the event queue is almost full;

an overrun means adapted to indicate when signaling events where missed due to the event queue being full; and a queue empty means adapted to indicate when the signaling queue is empty.

16. A method for processing signaling bit changes for telecommunication transmitted over a global network, comprising:

receiving a plurality of digital signals in a framer farm, the framer farm including a plurality of framers corresponding the plurality of digital signals, each digital signal including corresponding signaling bits;

extracting the signaling bits for each framer;

queuing the signaling bits in a signaling queue;

generating an event signal responsive to the queuing;

queuing the event signal in an event queue; and processing the signaling bits responsive to the event signal.

17. The method of claim 16 wherein queuing the signaling bits includes:

associating the signaling bits with an originating framer;

storing the signaling bits for the originating framer;

identifying a last entry for the originating framer; and identifying a timeslot related to the signaling bits for the originating framer.

18. The method of claim 16 wherein queuing the signaling bits includes reading the signaling queue with a signaling register.

19. The method of claim 18 wherein queuing the signaling bits includes circularly reading the signaling queue.

20. The method of claim 19 wherein circularly reading the signaling queue includes reading the signaling register and incrementing a signaling read pointer.

21. The method of claim 16 wherein generating an event signal includes generating a single event signal for every framer farm having framers issuing signaling bits.

22. The method of claim 16 wherein queuing the event signal includes sequentially storing the event signals.

23. The method of claim 16 wherein queuing the event signal includes reading the event queue with an event register.

24. The method of claim 16 wherein processing the signaling bits includes incrementing a queue depth register every time a new event signal is queued in the event queue and decrementing the queue depth register every time a queued event signal is removed from the event queue.

25. The method of claim 24 wherein processing the signaling bits includes comparing the queue depth register with a maximum queue depth register and setting a queue full bit if the queue depth register is greater than or equal to the maximum queue depth register.

26. The method of claim 25 wherein processing the signaling bits includes setting an overrun bit if event signals are not queued because the event queue is full.

27. The method of claim 25 wherein processing the signaling bits includes programming a partially full register to indicate a fraction of the maximum queue depth register with a high and a low threshold.

28. The method of claim 27 wherein processing the signaling bits includes setting an almost full bit when the queue depth register is greater than or equal to the partially full register.

29. A computer readable medium having stored thereon instructions, that, when executed by a computing device, result in:

receiving a plurality of digital signals in a framer farm, the framer farm including a plurality of framers corresponding the plurality of digital signals, each digital signal including corresponding signaling bits;

extracting the signaling bits for each framer;

queuing the signaling bits in a signaling queue;

generating an event signal responsive to the queuing;

queuing the event signal in an event queue; and processing the signaling bits responsive to the event signal.

30. The method of claim 29 wherein queuing the signaling bits includes:

associating the signaling bits with an originating framer;

storing the signaling bits for the originating framer;

identifying a last entry for the originating framer; and identifying a timeslot related to the signaling bits for the originating framer.

31. The method of claim 29 wherein queuing the signaling bits includes reading the signaling queue with a signaling register.

32. The method of claim 31 wherein queuing the signaling bits includes circularly reading the signaling queue.

33. The method of claim 32 wherein circularly reading the signaling queue includes reading the signaling register and incrementing a signaling read pointer.

34. The method of claim 29 wherein generating an event signal includes generating a single event signal for every framer farm having framers issuing signaling bits.

35. The method of claim 29 wherein queuing the event signal includes sequentially storing the event signals.

36. The method of claim 29 wherein queuing the event signal includes reading the event queue with an event register.

37. The method of claim 29 wherein processing the signaling bits includes incrementing a queue depth register every time a new event signal is queued in the event queue and decrementing the queue depth register every time a queued event signal is removed from the event queue.

38. The method of claim 37 wherein processing the signaling bits includes comparing the queue depth register with a maximum queue depth register and setting a queue full bit if the queue depth register is greater than or equal to the maximum queue depth register.

39. The method of claim 38 wherein processing the signaling bits includes setting an overrun bit if event signals are not queued because the event queue is full.

40. The method of claim 38 wherein processing the signaling bits includes programming a partially full register to indicate a fraction of the maximum queue depth register with a high and a low threshold.

41. The method of claim 40 wherein processing the signaling bits includes setting an almost full bit when the queue depth register is greater than or equal to the partially full register.

* * * * *